United States Patent [19]
Johnson

[11] 3,868,079
[45] Feb. 25, 1975

[54] LEVELING FOOT ASSEMBLY FOR A LAUNDRY APPLIANCE

[75] Inventor: Leslie Johnson, Mansfield, Ohio

[73] Assignee: Westinghouse Electric Corporation, Pittsburgh, Pa.

[22] Filed: July 9, 1973

[21] Appl. No.: 377,845

[52] U.S. Cl............. 248/188.4, 151/30, 248/188.9
[51] Int. Cl............................................ A47b 91/06
[58] Field of Search.......... 248/188.4, 188.9, 188.2; 151/30, 15, 41.74; 16/19

[56] References Cited
UNITED STATES PATENTS

| | | | |
|---|---|---|---|
| 2,314,728 | 3/1943 | Murphy | 151/30 |
| 2,354,374 | 7/1944 | Holmes | 151/15 |
| 2,697,916 | 12/1954 | Alsing | 16/19 |
| 2,725,667 | 12/1955 | Ingarra | 248/188.4 |
| 3,060,562 | 10/1962 | Fransson | 151/30 |
| 3,175,795 | 3/1965 | Adams | 151/41.74 |
| 3,742,552 | 7/1973 | Balchunas | 248/188.9 |

FOREIGN PATENTS OR APPLICATIONS
751,856 4/1954 Germany .................. 151/30

Primary Examiner—Marion Parsons, Jr.
Attorney, Agent, or Firm—F. A. Winans

[57] ABSTRACT

A leveling foot assembly for a laundry appliance, such as a washer, including an internally threaded T-nut attached to each corner of the bottom of the housing and a T-nut support having a flat head portion welded on the inner surface of the panel on the opposite side but concentric with the head of the T-nut. The T-nut support has a cylindrical sleeve defining one portion which circumferentially engages the cylindrical stem of the T-nut extending through the panel, and a terminal portion having a circular opening of a diameter less than the outer diameter of the threaded footbolt received within the T-nut. Thus, the T-nut support, in addition to providing lateral support for the T-nut interferingly engages the threads of the footbolt and prevents its turning unless deliberately done so with a tool.

1 Claim, 4 Drawing Figures

PATENTED FEB25 1975   3,868,079

LEVELING FOOT ASSEMBLY FOR A LAUNDRY APPLIANCE

BACKGROUND OF THE INVENTION

1. Field of the Invention

This invention relates to a leveling leg assembly for an appliance and more particularly to such an assembly that prevents vibration induced turning of the threadably received adjustable footbolt and further supports the T-nut receiving the footbolt against lateral movement.

2. Description of the Prior Art

In laundry machines such as household washers and dryers, it is important to maintain them substantially level or the vibration inherent during certain modes of operation will cause the machine to rock with sufficient violence in some instances to even cause the machine to move about on the floor or "walk." Thus, the feet on which such machines are generally supported are adjustable to compensate for various degrees of unevenness of the surface on which the machine sits. Such adjustment is generally provided by four threaded footbolts, one in each corner of the bottom panel of the machine, threadably received within a nut welded to or stationarily supported on the bottom panel. In addition, a jam nut was provided on the threaded shank of the footbolt so that after the bolt was adjusted to the proper length, the jam nut could be tightened against the T-nut to maintain the adjusted position. U.S. Pat. No. 3,175,795 is illustrative of a footbolt received within a threaded T-nut including a jam but for maintaining the adjusted position.

The above described assembly had at least two noticeable deficiencies. First, the configuration of the T-nut is such that the available flange head diameter providing attachment to the bottom panel, as by welding, is small compared to possible moment arm of the footbolt, such as when the machine is pushed along the floor. Hence, in service, weld failures or distortions at the point of the attachment of the assembly did occur. Second, a large number of service calls were required to correctly level the machine. In most instances it was found that the initial installation was faulty and that the jam nuts had not been drawn tight against the T-nut as required and subsequent operation of the machine caused vibrations which in turn rotated the footbolt to a different extended position.

SUMMARY OF THE INVENTION

The present invention eliminates the jam nut of the previous assembly and provides a T-nut support, similar in shape to the T-nut but having a flanged head of much greater diameter, welded to the opposite side of the bottom panel concentric with the T-nut and the sleeve portion of the support circumferentially engaging the stem portion of the T-nut. That portion of the sleeve of the T-nut support beyond the point of engagement of the T-nut defines a circular opening concentric with the T-nut but having a diameter less than the outer diameter of the threads of the footbolt. Thus, this portion of the support interferingly engages the threads of the footbolt to provide a frictional engagement greater than can be overcome through vibrational effects of the machine in addition to providing greater support for the I-nut against bending or breaking at its point of attachment to the panel from lateral forces on the footbolt.

DRAWING DESCRIPTION

DESCRIPTION OF THE PREFERRED EMBODIMENT

Figure 1:
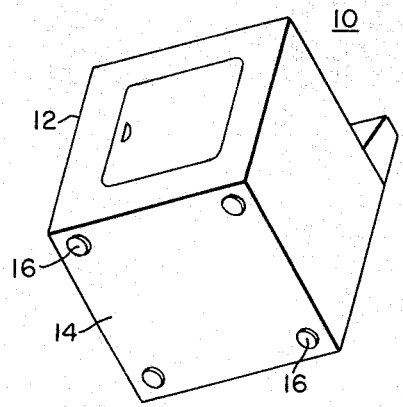
FIG. 1 is a bottom perspective of a laundry appliance.

Referring to FIG. 1, a laundry appliance 10 is shown which could either be a washer or dryer, but which in either case includes a generally cubical sheet metal housing 12 enclosing the operative components of the appliance such as a rotatable clothes containing tub, and having bottom sheet metal panel 14. The appliance is preferably supported on the floor by four adjustable foot assemblies 16, one in each respective corner.

Figure 2:
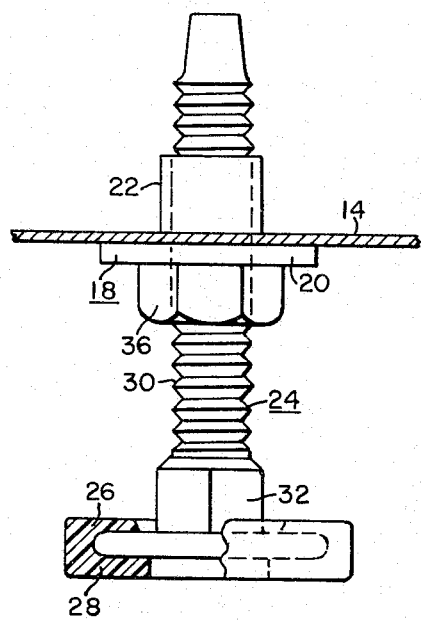
FIG. 2 is an elevational view of a typical prior art leveling foot assembly.

Referring now to FIG. 2, a typical prior art leveling foot assembly 16 is shown and includes a I-nut 18 having a head formed by a flat circular flange 20 in facing contact with the underside of the bottom panel 14 and an internally threaded stem 22 extending upwardly through an appropriately sized aperture in the panel. As a practical matter, the T-nut is secured to the bottom panel by spot welding the flange thereto.

A footbolt 24 is threadably received within the T-nut and includes an oversized generally flat head 26, preferably covered by a plastic coating 28 molded thereto to provide at least a limited cushion effect between the machine and the floor. The shank portion 30 of the bolt includes a square neck 32 adjacent the head with the remainder of the shank being threaded throughout its length. The end of the shank opposite the head defines a tapered or modified "F" point as at 34 to facilitate its initial threaded insertion through the I-nut whose threads are likely to have been subjected to a painting operation and may have accumulated paint that would otherwise interfere with the easy initial engagement between the bolt and the nut.

The prior art assembly also included a jam nut 36 threadably received on the shank of the footbolt so as to be between the head 26 of the bolt and the head of the T-nut. Thus, in making the adjustment, the jam nut would be screwed to a position on the shank where it would not interfere, and the footbolt would be screwed to the proper extension below the bottom panel so that it would, in cooperation with the remaining three bolts, support the machine in a level position. Proper installation would then require the jam nut to be screwed tight against the head of the T-nut preferably with a wrench so that a sufficient force was established to prevent the jam nut from working lose from vibrations as the machine operated. However, as is evident, both the bolt and the jam nut could easily be turned with the fingers, and since the assemblies so readily lent itself to such, it was done without realizing that it would likely require a service call to correct.

Further, it is seen from such prior art assembly, movement of the machine across the floor on which it is supported, without lifting, would require the footbolt to slide. This develops a moment about the point of attachment of the T-nut to the bottom panel that, depending upon the length of extension of the footbolt and the lateral force developed at the bolt head, could bend the bottom or break the welded connection between the bottom panel and the T-nut, either of which also aggravated the vibration problem and would likely result in a subsequent service call.

Figure 3:
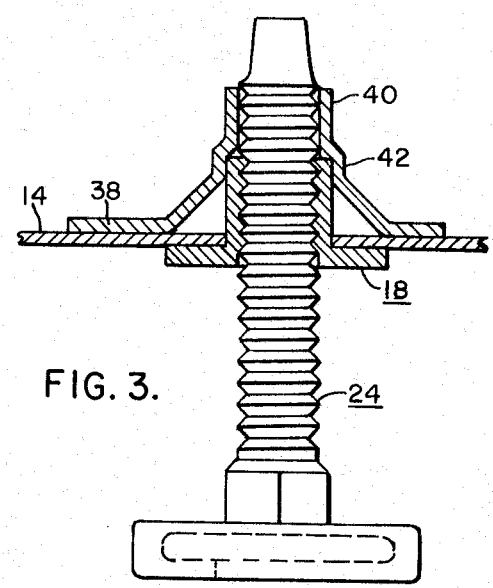
FIG. 3 is a cross sectional elevational view of the leveling foot assembly of the present invention.

Referring now to FIG. 3, it is seen that the leveling foot assembly of the present invention includes the T-nut 18 and footbolt 24 as previously described but eliminates the jam nut 36 in lieu of a T-nut support which itself includes a head formed by a flange 38 of greater diameter than the flange of the T-nut 18 and in facing engagement and welded to the opposite face of the bottom panel 14.

The sleeve 40 of the T-nut support extends axially in the same direction as, and concentric with, the stem of the T-nut and includes a portion 42 which circumferentially engages the stem of the T-nut in a substantially tight fit perferably adjacent the end thereof. Beyond this point the opening through the sleeve of the T-nut support is reduced in diameter so as to be less than the outer diameter of the threads of the footbolt whereby, when the footbolt is inserted through the T-nut and far enough to be contacted by this portion of the T-nut support it distends, to some extent, the opening of the T-nut support so as to accommodate the bolt in an interfering fit. Because of this interfering fit there are sufficient frictional forces between the T-nut support and the threads of the footbolt so that a minimum torque of some magnitude must initially be applied before the footbolt will turn. This initial torque must be greater than can be overcome through the vibration of the machine. Further, this fit is sufficiently tight so that the footbolt can no longer be adjusted by the fingers. Thus, although this footbolt assembly requires a tool to make the proper adjustment, once it is made no further steps are required to insure it will remain in the adjusted position.

Figure 4:
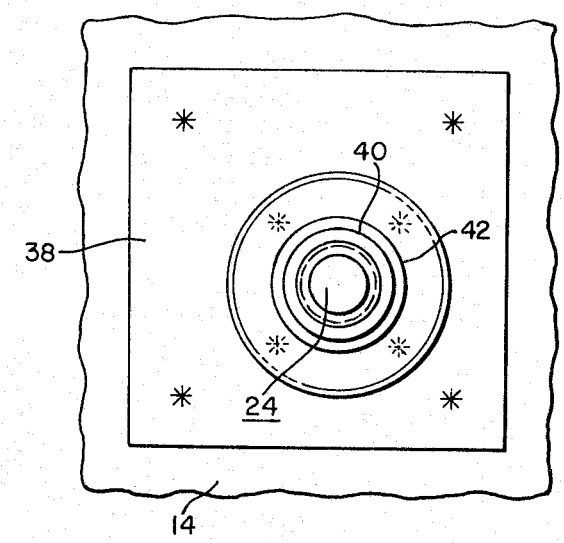
FIG. 4 is a top plan view of the present invention.

Referring to FIG. 4, relative size of the flanges on both the T-nut and the T-nut support are shown from which it can be appreciated that lateral forces applied to the footbolt are distributed over a much wider area on the T-nut support than previously available when they were transmitted only to the flange area of the T-nut. Further, such larger flange permits the use of more welds all of which provides a much stronger point of attachment between the bottom panel and the assembly so that it can withstand relatively large lateral forces on the footbolt without bending the bottom panel or destroying the welded junction.

Thus, the adjustable leveling assembly of the present invention provides a stronger attachment between the assembly and the bottom panel of the housing and maintains the footbolt at the adjusted length even under conditions of extreme vibration.

I claim:

1. An adjustable leveling foot assembly for a laundry appliance having a housing including a bottom panel, said assembly comprising;
    a nut having a flanged head attached to said panel in facing engagement with the underside of said panel and an integral internally threaded stem extending upwardly through an appropriately sized aperture in said panel;
    a footbolt having a weight-bearing head and a threaded shank portion, said shank portion being threadably received within said stem for adjustable extension from said nut by turning said footbolt;
    sleeve means engaging the stem end of said nut adjacent said upper end, said sleeve having a flat flange area in engagement with said panel on the side opposite said flanged head of said nut, said flanged area extending along said panel a greater dimension than said head and said sleeve interferingly engaging the portion of said footbolt extending from said upper end of said nut to prevent vibrationally induced turning of said bolt.

* * * * *